US007953692B2

(12) United States Patent
Bower et al.

(10) Patent No.: US 7,953,692 B2
(45) Date of Patent: May 31, 2011

(54) PREDICTING CANDIDATES USING INFORMATION SOURCES

(75) Inventors: Jason Bower, Bothell, WA (US); Chet Laughlin, Kirkland, WA (US); Daryn Elliot Robbins, Duvall, WA (US); Kenichi Morimoto, Sagamihara (JP); Peter Davis, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 11/952,600

(22) Filed: Dec. 7, 2007

(65) Prior Publication Data

US 2009/0150322 A1 Jun. 11, 2009

(51) Int. Cl.
*G06F 17/00* (2006.01)
*G06F 17/20* (2006.01)
*G06F 17/18* (2006.01)
(52) U.S. Cl. .............................. 706/50; 706/18; 706/21
(58) Field of Classification Search ...................... 706/50
See application file for complete search history.

(56) References Cited

U.S. PATENT DOCUMENTS

| 5,805,911 | A | 9/1998 | Miller | 395/796 |
|---|---|---|---|---|
| 5,952,942 | A | 9/1999 | Balakrishnan | 341/20 |
| 6,011,554 | A | 1/2000 | King | 345/352 |
| 6,392,640 | B1 | 5/2002 | Will | 345/184 |
| 6,973,332 | B2 | 12/2005 | Mirkin | 455/556 |
| 7,155,683 | B1 | 12/2006 | Williams | 715/816 |
| 2002/0032511 | A1* | 3/2002 | Murakami et al. | 701/50 |
| 2006/0156233 | A1 | 7/2006 | Nurmi | 715/532 |
| 2006/0206816 | A1 | 9/2006 | Nordenhake | 715/534 |
| 2006/0221060 | A1 | 10/2006 | Fux | 345/171 |
| 2007/0040813 | A1 | 2/2007 | Kushler | 345/173 |
| 2007/0061301 | A1 | 3/2007 | Ramer | 707/3 |

OTHER PUBLICATIONS

Culotta et al., "Confidence Estimation for Information Extraction", Human Language Technology Conference of the North American Chapter of the Association for Computational Linguistics (HLT/NAACL), Boston, MA, 2004.*
Chen et al. (Chen), "User Intention Modeling inWeb Applications Using Data Mining", World Wide Web: Internet and Web Information Systems, 5, 181-191, 2002.*
Culotta et al., Corrective Feedback and Persistent Learning for Information Extraction, Jul. 28, 2006.*
Stocky, et al., "A Commonsense Approach to Predictive Text Entry", MIT Media Laboratory, 20 Ames St., Bldg E15, Cambridge, MA 02139, CHI 2004, Apr. 24-29, http://delivery.acm.org/10.1145/990000/986014/p1163-stocky.pdf?key1=986014&key2=2354654811&coll=GUIDE&dl=GUIDE&CFID=28525507&CFTOKEN=49768916, pp. 1163-1166, (4 pages).

* cited by examiner

*Primary Examiner* — David R Vincent
*Assistant Examiner* — Nathan H Brown, Jr.
(74) *Attorney, Agent, or Firm* — Merchant & Gould

(57) ABSTRACT

Embodiments are configured to provide one or more candidates based in part on an input. In an embodiment, a system includes a prediction engine which can be configured to provide one or more ranked candidates using one or more configurable data sources and/or candidate providers. Each data source can be configured to include a candidate provider to predict and return predicted candidates. The prediction engine can use a predicted candidate to rank and return a ranked candidate to a user interface, process, or other application. In one embodiment, a computing device can include and use a prediction engine which can use a customized ranking component to rank and return ranked candidates based in part on a query type. The customized ranking component can use predicted candidates provided by one or more data sources and/or candidate providers when making a ranking determination.

19 Claims, 3 Drawing Sheets

PREDICTING CANDIDATES USING INFORMATION SOURCES

BACKGROUND

More and more people use computing devices, including handheld mobile devices, for business and personal uses. The size and portability of handheld mobile devices make them particularly attractive to users. However, the size of the input controls and display can adversely affect the user experience. For example, handheld devices tend to have small keypads, such as thumb keyboards or 12-key keypads. As a result, it can be more difficult and less efficient when entering inputs to a handheld device as compared to using a larger keyboard. Text prediction methods have been developed to try and reduce the amount of manual input required by application users, including handheld applications users. The text prediction methods are generally limited to specific prediction models and resources.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide one or more candidates based in part on an input. In an embodiment, a configurable system includes a prediction engine which can be configured to provide one or more ranked candidates using a number of data sources and/or candidate providers. Each data source can be configured to include a candidate provider and a store for storing information. Candidate providers can be configured to receive input queries from the prediction engine and return predicted candidates to the prediction engine. The prediction engine can use the predicted candidates provided by a candidate provider to rank and return a ranked candidate to an input method or other user interface. Moreover, data sources, candidate providers, and other components can be added, removed, and/or reconfigured according to a desired implementation. In one embodiment, a computing device can include and use a prediction engine having a customizable ranking component to rank and return ranked candidates to a user based in part on a query type. The prediction engine can use the ranking component to rank and order predicted candidates provided by one or more configurable data sources and/or candidate providers.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
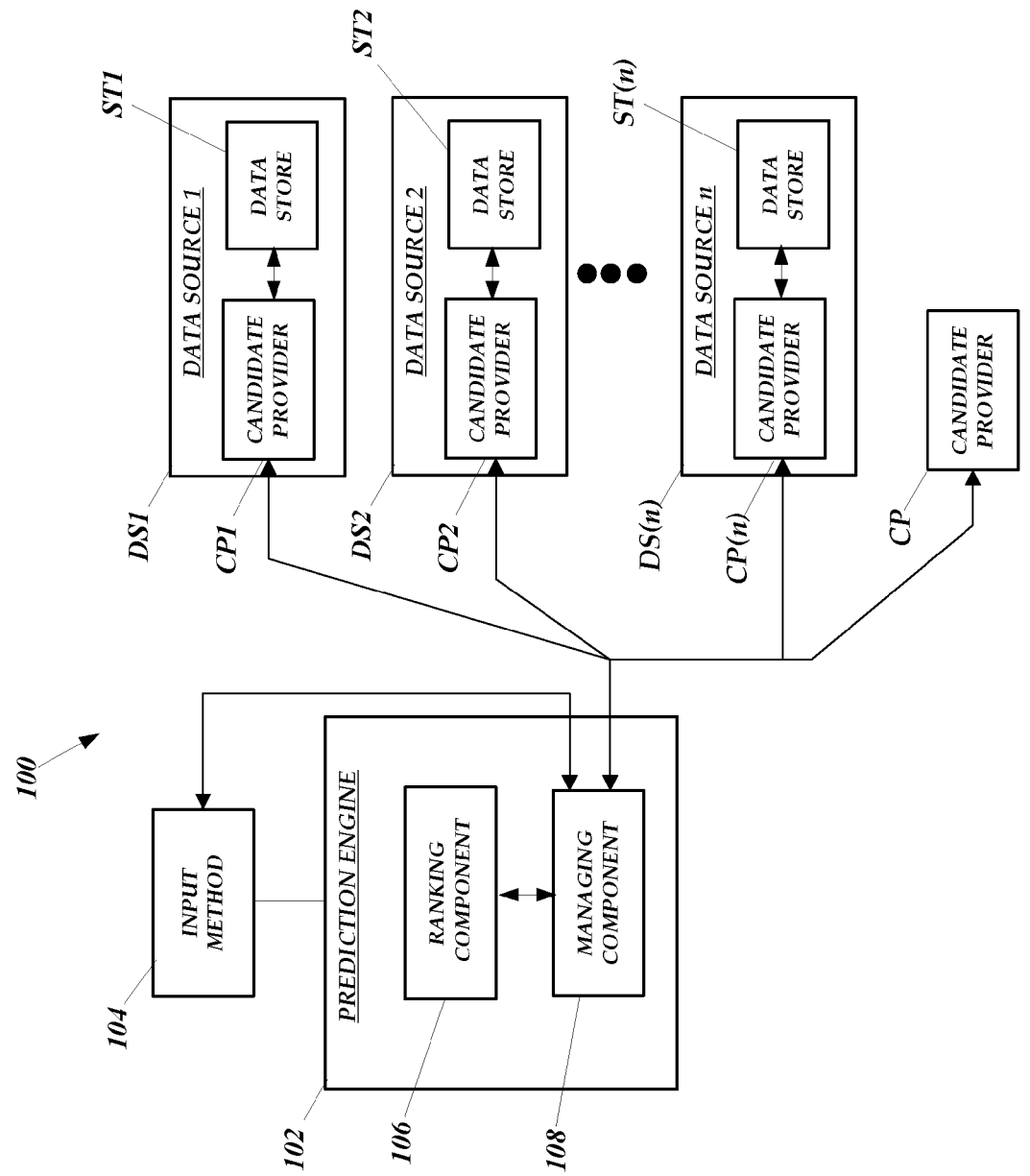
FIG. 1 is a block diagram of an example system to provide information based on an input.

Embodiments are configured to provide one or more candidates based in part on a user input or communication. In an embodiment, a system includes a prediction engine which can be configured to provide one or more candidates associated with a plurality of information sources. For example, the system can include and use text-based data sources, speech-based data sources, and/or handwriting-based data sources, when providing candidates to a user based in part on an input or communication. Components of the system can be dynamically added, removed, configured, and/or reconfigured, and at desired times. For example, users and applications can add, remove, configure, and reconfigure data sources, candidate providers, ranking components, etc.

Components of the system can be used with various input methods, including input method editors (IMEs) to predict text, handwriting systems to predict words based on handwritten inputs, and/or voice systems to predict words based on vocalized inputs, but the system is not so limited. For example, the system can be configured to provide candidates while reducing a number of key presses, taps, and/or handwriting strokes required as part of an input or other operation. The system can use multiple languages, input methods, ranking components, data sources, and/or candidate providers. For example, certain input methods benefit by accessing data sources made available to disparate input methods without knowledge of where or how the data or data sources are provided. In one embodiment, the system can be configured with a customized ranking component or ranker, which can be tailored to include a particular ranking and/or predictive functionality.

In an embodiment, a computing system includes a prediction engine having a ranking component that includes a ranking algorithm to rank one or more candidates based in part on an input query and one or more predicted candidates associated with one or more information sources. In one embodiment, an input query can be associated with one or more data sources and candidate providers which can be configured to provide one or more predicted candidates based on the input query and other factors. The one or more data sources can be configured to include one or more candidate providers and associated data stores to store prediction data and other information. Each candidate provider can be configured to predict candidates based on a prediction model or other predictive technique, such as an n-gram prediction model for example.

In another embodiment, a communication device can be configured to accept different user input types, such as handwritten input, speech input, typed input, or some other type of input. The communication device can include a prediction engine to provide one or more ranked candidates based in part on user input. The prediction engine can include a customizable ranker for ranking candidates and a manager for managing inputs and outputs.

In one embodiment, the ranker includes a ranking algorithm configured to provide a ranked candidate based in part on a confidence parameter and a candidate probability associated with a prediction by a candidate provider. The prediction engine can use data sources and candidate providers, including configurable data sources and candidate providers, associated with a particular input type and/or those that are not necessarily associated with a particular input type when providing ranked candidates.

In one embodiment, a software application having executable instructions can be configured to provide one or more candidates based in part on a user input or communication. The application can include a prediction engine which can be incorporated with a mobile input platform. In one embodiment, the prediction engine can be configured to determine a word or phrase that a user is attempting to input to assist the user to input the information faster and with less effort. For example, the prediction engine can be used by various input method editors (IMEs) to provide text prediction, handwriting applications to provide improved handwriting accuracy and prediction, and voice dictation applications to improve vocalized recognition and correction accuracy. The application can be used with multiple data sources and candidate providers to provide one or more predicted candidates based in part on user input, such as typed input, spoken input, or handwritten input for example.

FIG. 1 is a block diagram of a system 100, according to an embodiment. As described below, components of the system 100 can be configured to provide one or more candidates based in part on user input. For example, components of the system 100 can be configured to provide words, phrases, compound words, acronyms, uniform resource locators (URLs), or other information representations that can be predicted based on a user input, such as handwritten, spoken, typed, or another type of input. The system 100 can be used with various types of inputs, including different languages and input methods. In one embodiment, the system 100 can be configured as a software application including executable instructions and other functionality to use a plurality of disparate data sources to automatically suggest a candidate based on user input. As described below, different data sources can be included with or excluded from the system 100.

As shown in FIG. 1, the system 100 includes a prediction engine 102 that can be configured to predict one or more candidates based in part on user input. As described below, the prediction engine 102 can use information associated with multiple information sources when predicting candidates. In an embodiment, the prediction engine 102 can be included with a computing device, such as a smart device, or as part of an application. The prediction engine 102 can be used to predict one or more candidates in the context of an email communication, a text messaging communication, a word processing application, an inking application, a speech-based application, or some other communication or application. Once predicted, one or more of the predicted candidates can be provided to a user or application. For example, the prediction engine 102 can operate to predict words and phrases based on partially recognized handwritten input, partially recognized typed input, and/or partially recognized speech input, wherein the predicted words and phrases can be displayed on a user device, such as a handheld communication device, laptop, desktop, or other computing device.

The system 100 can include an Input Method 104 or other user interface (UI) that can be used by a user to interact with the prediction engine 102. In one embodiment, the Input Method 104 can be configured to enable a user to input information according to a type of input method or language. For example, based on the configuration and functionality of the associated computing device, a user can use the Input Method 104 to type inputs, handwrite inputs, or provide spoken words as inputs, wherein the prediction engine 102 can use the input to predict one or more candidates. As used herein, a typing input method may also be referred to as an input method editor (IME).

With continuing reference to FIG. 1, the prediction engine 102 includes a ranking component 106 (hereinafter ranker 106) and a managing component (hereinafter manager 108). In one embodiment, the functionalities of the ranker 106 and manager 108 can be combined as a single component. As described further below, the ranker 106 can be configured to rank and order candidates associated with a plurality of information sources, such as data sources DS1-DS(n). Users, input methods, and other applications can define a particular ranking functionality which may be registered with a prediction engine instance for a desired implementation. In one embodiment, the prediction engine 102 can include a plurality of ranking components that can be selectively used by a particular input method. For example, an input method can select a ranking component that best meets its needs based on a particular implementation. The manager 108 can operate to forward all prediction results from utilized data sources to a selected ranking component of the plurality of ranking components for making a ranking determination.

The manager 108 manages communication with various input methods, ranker 106, data sources, and/or candidate providers. As described below, the data sources DS1-DS(n) are registered so that the manager 108 can quickly determine which of the data sources DS1-DS(n) are capable of processing a particular input query. An input query that defines the type of prediction results can be used by the manager 108 when determining which of the data sources DS1-DS(n) or candidate providers should be used to process a particular query.

In an embodiment, an input query can contain a number of associated properties, including but not limited to: previous word primitives; undetermined input stream; input language or languages; input scope; input type; query type; candidate type; and/or, a maximum number of candidate results. As used herein, previous word primitives refer to a prediction engine class object that contains a reading string and display string. The previous word primitives can be configured as a word separated list of word primitives that the user has entered and can be used by the prediction engine 102 for context to improve prediction accuracy. For example, if a previous word is "Microsoft" and the current input is "Wi" then the prediction engine 102 may suggest "Windows" over "Will" even if "Will" has a higher probability in the current language model.

An undetermined input stream can refer to index data which contains actual string data, wherein the string data can include any data type, such as byte, WORD, DWORD, etc. An input stream can refer to a data array logically. In one embodiment, the elements of a data array include: 1) offset data to input string; 2) offset data to display string; and, 3) some additional user defined information (e.g., language, data sources to use, candidate providers to user, ranking component to use, etc.). In one embodiment, the data in an input stream can be quantified by the input type and/or query type.

The input language(s) refers to the language that prediction words should conform to. Input scope refers to how an input method can pass in the input scope of the input control to the prediction engine 102 to improve prediction accuracy. For example, an input scope can be used to notify the prediction engine 102 that a user is trying to enter a zip code, phone number, address, URL, email address, etc. Input type refers to a type of input associated with an undetermined input stream, which can include a particular language or input method. For example, a Japanese input method editor (IME) sends an input query with a single Hiragana undetermined match which is sent by the manager 108 to a Japanese data source that supports JPN Hiragana input. The Japanese data source returns potential candidates that match the Hiragana input.

Query type refers to a type of undetermined input stream. In one embodiment, the query type includes a prefix type or an exact match type. The prefix type refers to an undetermined string which includes one or more word prefix strings. For example, an IME may search for "Mic" in the expectation to get candidate results back such as Microsoft, Microwave, Mickey, etc. For example, a 12-key input method might submit a prefix query with undetermined strings that match the key input of 12 like "AD,AE,AF,BD,BE,BF,CD,CE,CF." The exact match refers to an undetermined string requested for ranking by an input method. For example, handwriting and voice-based input methods may request a ranking based on which of several possible words are the most probable based in part on a ranking and ordering determination.

Candidate type refers to a type of candidate that the prediction engine 102 can return. In one embodiment, there are four candidate types: primitive; word; phrase; and, sentence. A primitive candidate type refers to a reading string+display string pairing. In many languages, Chinese for example, the display of the reading of a word uses different characters from the display of a word. In Chinese, the reading string may be "li" while the display string is "李". In Chinese multiple display strings have the same reading string. "li" can also be "里" etc. In East Asian languages 1 or more characters are grouped together to make words. A word candidate type refers to multi-primitive candidates. A phrase candidate type refers to multi-word candidates. A sentence candidate type refers to sentence candidates. Maximum number of results refers to the maximum number of results to be returned based on a ranking determination.

Correspondingly, the manager 108 can process user input received from the Input Method 104 and communicate the request to one or more applicable data sources and/or candidate providers based in part on the properties associated with the input query. For example, a user can use the Input Method 104 or some other input mechanism to provide a text input from a keyboard, recognized handwriting, or recognized speech input. In one embodiment, the manager 108 can direct requests to one or more of the data sources DS1-DS(n) based on the input type or input method. The manager 108 can then collect the results, such as one or more predicted candidates from the one or more applicable data sources, which can be communicated to the ranker 106 for ranking, sorting, and/or ordering. The manager 108 can then collect the results from the ranker 106 which can be communicated to the Input Method 104. For example, the manager 108 can communicate the ranked results to an IME being used by a user.

The data sources DS1-DS(n) can be configured as disparate information repositories having associated candidate providing methods. For example, the data sources DS1-DS(n) can be used to differentiate access points for various lexicon collections. As used herein, in linguistics, the lexicon of a language is its vocabulary, including its words and expressions. A lexicon collection can refer to a collection of words. In some cases, a lexicon collection can refer to dictionaries, language models, etc. A language model refers to collections of lexicons in a specific data-format that includes information about how the words are used in the language. Some language models can also include word frequency data.

The data sources DS1-DS(n) can be configured to provide one or more candidates, whether by prediction or some other method, based in part on an input query or other input. For example, the manager 108 can communicate user input associated with a text messaging communication to one or more of the data sources DS1-DS(n) which can operate to return predicted next words based on the context of the user communication. As described above, an input query can be configured as a data structure which provides information that can be used to determine a candidate, such as a word, that a user desires. For example, input queries can contain information like previous word primitives, a current or undetermined input stream, type of input language, contextual information to assist in narrowing the type of input desired, the query type to be performed, data sources to use for the query, etc.

As shown in FIG. 1, the data sources DS1-DS(n) include associated candidate providers CP1-CP(n) which receive input queries from the manager 108 and return candidate results (also referred to as predicted candidates) and other information to the manager 108. In an embodiment, one or more of the candidate providers can return predicted candidates, associated probabilities, and/or a name of an associated data source. For example, a candidate provider can return a candidate and an associated probability based on word frequency, statistical data, n-gram model, etc. The data source name can be used to identify the data source which provided a particular candidate. The data source name can also be used by input methods or ranking algorithms to determine which data source is more accurate in specific situations, and used to change data source weights over time. In one embodiment, each candidate provider CP1-CP(n) can be configured as an application programming interface (API) to operate between the manager 108 and a respective data source. Each candidate provider can include a prediction model for predicting candidates. For example, one candidate provider can be configured with an n-gram language model, whereas another candidate provider can be configured with a different probability model.

According to various configurations, different combinations of data sources DS1-DS(n) can be used to obtain certain prediction results. In some cases, certain data sources can be more desirable based on an input type. The manager 108 can be used to associate certain confidence parameters to different data sources DS1-DS(n). In one embodiment, the manager 108 can associate different weights with certain data sources DS1-DS(n) which the ranker 106 can use when ranking candidates, as described further below. In an embodiment, the manager 108 can send an input query to applicable data sources based in part on the confidence parameter which can be associated with each data source. A confidence parameter can also be assigned to a candidate provider.

As shown in FIG. 1, the data sources DS1-DS(n) also include respective stores ST1-ST(n) to store data, such as words, metadata, and other information, for use by the candidate providers CP1-CP(n) when providing candidates to the manager 108. Another candidate provider CP is shown without an associated store to accommodate implementations that use a programmatic solution rather than a defined data source. In another embodiment, a candidate provider can be used in conjunction with multiple data sources and associated stores. In certain embodiments, one or more of the data sources DS1-DS(n) can be included with a respective computing device and/or remotely accessed, dependent upon the particular computing and/or prediction architecture. The data sources DS1-DS(n) can be updated, modified, added, and/or removed. In certain cases, a data source can be updated based on a user action associated with a candidate. For example, a user may select or skip a returned candidate, and the interaction information can be used to update one or more of the data sources DS1-DS(n).

In an embodiment, each data source DS1-DS(n) can include a unique architecture for predicting candidate(s), such as one or more words for example, based on a given input. For example, some data sources may use prefix matching to return all words that start with a given prefix; whereas, other data sources can use more advanced techniques to return words with different probability weights based in part on additional information that is associated with an input query. As an example, data source DS1 can be configured with a static word provider and a static word dictionary; data source DS2 can be configured with an input history provider and a input history store; data source DS3 can be configured with a used word provider and a used word store; data source DS4 can be configured with a handwriting-based word provider and associated store; DS5 can be configured with a speech-based word provider and associated data store; DS6 can be configured with a language-specific word provider and associated data store, etc. Additional examples of data sources DS1-DS(n) include multiple dictionaries supporting multiple languages, URL lists, contacts, email address sources, and other data and information structures for storing and providing information. Moreover, data sources, including custom data sources, may be added to and/or removed from the system 100 according to a desired implementation.

Disparate data sources and/or candidate providers to be used for predicting candidates can be registered with an associated computing device, application, or method. In an embodiment, a number of registry keys can be used to register data sources, wherein the registry keys can be used to: store a list of all registered data sources; identify capabilities of the registered data sources; identify an associated weight of each registered data source; and, provide other custom information that may be of interest to applications, input methods, or users.

For example, a data sources registry hive can be defined as:

HKEY_LOCAL_MACHINE\Software\MicrosoftMTF\DataSources\

The data sources registry hive can include a new key defined by a name of a data source.

As an example, a static dictionary data source can use a key called HKEY_LOCAL_MACHINE\Software\MicrosoftMTF\DataSources\SDDS to identify the data source.

In one embodiment, the values in Table 1 below can be defined for each data source key.

TABLE 1

| Name | Type | Value |
|---|---|---|
| DataSourceName | String | A unique name for a data source. |
| Languages | Multi-String | List of Language local IDs (LCID's) that a data source predicts results in. |
| Candidate Type | DWORD | 0 - Primitive (Candidate contains Single Primitive)<br>1 - Word (Candidate contains Multi-Primitives)<br>1 - Phrase (Candidate contains Multi-Primitives which forms a phrase)<br>3 - Sentence (Candidate contains Multi-Primitives which forms a sentence) |
| DSWeight | DWORD | Default data source weight 0-100 |

TABLE 1-continued

| Name | Type | Value |
|---|---|---|
| QueryType | DWORD | 0 - Prefix<br>1 - Exact Match<br>2 - Regular Expression |
| Input Type | Multi-Word String | List of input types that match existing global unique identifiers (GUIDs) or (GUIDs) that a data source supports input for. |
| Dynamic | DWORD | 0 - Static (Default)<br>1 - Dynamic<br>Dynamic data sources can change over time. |

As shown in Table 1, a registry hive can also be used to define a default data source weight for each data source. The default weight for each applicable data source can be used when the manager 108 is initialized. Applications and input methods can change the weight of data sources within the prediction engine dynamically by calling a manager API described below. A default weight for a data source can be defined in the registry as a value between zero and 100. A value of zero indicates that a data source should be skipped by default, and a value of 100 indicates that a data source should get as much weight as possible. Correspondingly, weights can be adjusted according to values along the scale.

An initial weight of a data source can be defined as the default weight divided by the sum of all default weights (i.e., initial weight=default weight/(sum of all default weights). In an embodiment, the manager 108 can be configured to calculate the actual weight of a data source at initialization by dividing the default weight by the sum of all the default weights. An API that provides access for applications and input methods to change weights can represent a weight of each data source as a number less than 1. If an application or input method attempts to set an invalid weight, it will be rejected and a default weight will be used. If the default weight defined in the registry key is greater than 100, 100 will be used as the weight. If the weight is defined as less than zero, zero will be used as the weight. For example, a messaging application may want to ensure that the candidate results that come from an application defined data source have more weight in the prediction results than candidates from a static dictionary. As another example, an input method may only want to predict words using a proprietary dictionary rather than using a static dictionary, so the proprietary dictionary weight can be set to a high value and the static dictionary weight can be set to zero.

In an embodiment, the manager 108 includes a manager interface which can be configured to communicate candidates to and from the ranker 106 and/or one or more of the data sources DS1-DS(n), configure the data sources DS1-DS(n), and customize aspects of the prediction engine 102. Other interfaces used by the prediction engine 102 are described below.

In one embodiment, the manager interface can be configured as follows:

```
interface IMtfPredictionManager : IUnknown {
    // Query Candidates
    HRESULT GetCandidates(
    [in] IPredictionInputQuery *pInputQuery,
    [out] IEnumPredictionCandidate **ppEnumCandidate);
    /*The Input method will call GetCandidates( ) passing the input query and it will
get back a list of prediction candidates based on that input query. */
    // Data Source management
    HRESULT AddCustomDataSource(
    [in] IPredictionDataSource *pDataSource,
```

```
    [out, retval] DWORD *pdwDataSourceID);
    /* AddCustomDataSource provides an API that can used to add a Custom data
source to the list of data sources that are used by the prediction engine. Note: All existing
data sources will be read from the registry and initialized when the prediction engine is used.
*/
    HRESULT RemoveCustomDataSource(
    [in] DWORD dwDataSourceID);
    /* RemoveCustomDataSource provides an interface that allows a specific custom
data source to be removed from the list of data sources that are used for prediction. */
    HRESULT EnumDataSource(
    [out, retval] IEnumPredictionDataSource **ppEnumDataSource);
    /*EnumDataSource provides a way to enumerate data sources, such as
enumerating all default data sources and all registered custom data sources. */
    HRESULT PurgeAllDataSources( );
    /* PurgeAllDataSources removes all data sources from the prediction engine.
Data sources must be added or restored before prediction engine will provide candidate
results again. */
    HRESULT RestoreDefaultDataSourceSet( );
    /* RestoreDefaultDataSourceSet restores all data source information based on the
data source information that is defined in the registry.    After being called, the data source
information should be the same as if the prediction engine were just initialized. */
    HRESULT RegisterCustomRanker(
    [in] IPredictionCandidateRanker *pPredictionCandidateRanker);
    /* RegisterCustomRanker provides customizability of ranker for prediction
engine clients. Clients can use this interface to register custom ranker and/or ranking
algorithms. */
    HRESULT GetDefaultRanker(
    [out] IPredictionCandidateRanker **ppPredictionCandidateRanker);
    /* GetDefaultRanker returns pointer to instance of default ranker. This method is
a utility method for custom ranker made by clients. Clients can utilize default ranker in their
own ranker implementation. */
```

In one embodiment, an input query interface can be configured to manage an input query as follows:

```
// IMtfPredictionInputQuery interface
//---------------------------------------------
// Data Container for Input Query.
//
    interface IMtfPredictionInputQuery : IUnknown {
        HRESULT Initialize( );
        HRESULT SetInputStream([in] BYTE *pbStream,
        [in] DWORD cbStream);
        HRESULT AddInputLanguage([in] BSTR bstr);
        HRESULT ClearInputLanguage( );
        HRESULT AddInputScope([in] DWORD dw);
        HRESULT ClearInputScope( );
        HRESULT AddInputType([in] GUID guid);
        HRESULT ClearInputType( );
        HRESULT SetQueryType([in] DWORD dw);
        HRESULT SetCandidateType([in] DWORD dw);
        HRESULT SetMaxResults([in] DWORD dw);
        HRESULT SetMaxWait([in] DWORD dw);
        HRESULT AddPreviousPrimitive([in]
IEnumPredictionCandidatePrimitive* pEnumPrimitive);
        HRESULT ClearPreviousPrimitive( );
    };
```

In one embodiment, a ranker interface can be configured as follows:

```
// IPredictionCandidateRanker interface
//---------------------------------------------
// Ranker of Prediction Candidate
//
    interface IMtfPredictionCandidateRanker : IUnknown {
        HRESULT AddCandidates(
        [in] IPredictionInputQuery *pInputQuery,
        [in, out] IEnumPredictionCandidate **ppEnumBaseCandidates,
        [in] IEnumPredictionCandidate **ppEnumAddedCandidates);
        /* This method is called to add candidates from a data source to a
base candidate list after candidate generation from each data source.
Ranker can implement incremental ranking by this method. */
        HRESULT RankCandidates(
        [in] IPredictionInputQuery *pInputQuery,
        [in, out] IEnumPredictionCandidate **ppEnumCandidate);
        /* This method is called once per query after all candidates are
generated from add data source. Ranker can implement batch ranking
by this method. And Custom Ranker can adjust candidate ranking based
on Default Ranker output.*/
    };
```

In one embodiment, a data source interface can be used to provide access to a data source by the manager 108 or some other component or application, and can be configured as follows:

```
// IMtfPredictionDataSource interface
//---------------------------------------------
// Data Source
//
    interface IMtfPredictionDataSource : IUnknown
    {
        //Sync Query
        HRESULT GetCandidates(
        [in] const IPredictionInputQuery *pInputQuery,
        [out, retval] IEnumPredictionCandidate **ppEnumCandidate);
        //Query Properties
        HRESULT         SetParameterMaximumCandidates([in]
DWORD dwMaximumCandidates );
        HRESULT    GetParameterMaximumCandidates([out,
retval]   DWORD pdwMaximumCandidates );
        //DS Properties
        HRESULT GetSupportedLanguages([out, retval] BSTR *pbstr);
        HRESULT GetPersistency([out, reval] DWORD *pdwPersistency);
        HRESULT GetQueryType([out, reval] DWORD *pdwType);
        HRESULT   GetInputScopes([out]   DWORD   **ppInputScope,
        [out]  UINT *pcCount);
        HRESULT GetDataSourceWeight([out, retval] DWORD
        *pdwWeight);
```

```
    HRESULT SetDataSourceWeight([in] DWORD dwWeight);
    HRESULT EnableDataSource([in] BOOL fEnable);
    HRESULT GetID([out, retval] DWORD *pdwDataSourceID);
    HRESULT SetID([in] DWORD dwDataSourceID);
};
```

In one embodiment, a prediction candidate primitive interface can be configured to access candidate primitives as follows:

```
// IPredictionCandidatePrimitive interface
//---------------------------------------------
// Data Container for Prediction Candidate Primitive.
//
interface IMtfPredictionCandidatePrimitive : IUnknown {
    HRESULT GetDisplay([out, retval] BSTR* pbstrDisplay);
    HRESULT GetReading([out, retval] BSTR* pbstrReading);
    HRESULT GetUserDataPtr([out, retval] VARIANT* vpUserData);
    HRESULT GetUserDataSize([out, retval] DWORD*
        pdwUserDataSize);
    HRESULT GetProbability([out, retval] DWORD* pdwProbability);
};
```

In one embodiment, a prediction candidate result interface can be configured to provide and/or access prediction candidates as follows:

```
// IPredictionCandidate interface
//---------------------------------------------
// Data Container for Prediction Candidate.
//
interface IMtfPredictionCandidate : IUnknown {
    HRESULT GetDisplay([out, retval] BSTR* pbstrDisplay);
    HRESULT GetReading([out, retval] BSTR* pbstrReading);
    HRESULT GetProbability([out, retval] DWORD*
        pdwProbability);
    HRESULT EnumPrimitive([out, retval]
IEnumPredictionCandidatePrimitive** ppEnumPrimitive);
    HRESULT GetDataSourceID([out, retval] DWORD*
        pdwDataSourceID);
};
```

In one embodiment, an enumerator interface can be configured enumerate prediction candidate primitives as follows:

```
// IEnumPredictionCandidatePrimitive interface
//---------------------------------------------
// Enumerator of Data Source
//
interface IEnumIMtfPredictionDataSource : IUnknown {
    HRESULT Next( [in] ULONG ulCount, [out]
IPredictionDataSource **ppDataSource, [out] ULONG *pcFetched );
    HRESULT Skip( [in] ULONG ulCount );
    HRESULT Reset( void );
    HRESULT Clone( [out] IEnumPredictionDataSource **ppenum );
};
```

In one embodiment, an enumerator prediction candidate primitive interface can be configured as follows:

```
// IEnumPredictionCandidatePrimitive interface
//---------------------------------------------
// Enumerator of Prediction Candidate Primitive
//
interface IEnumIMtfPredictionCandidatePrimitive : IUnknown {
    HRESULT Next( [in] ULONG ulCount, [out]
IPredictionCandidatePrimitive **ppPrimitive, [out] ULONG *pcFetched );
    HRESULT Skip( [in] ULONG ulCount );
    HRESULT Reset( void );
    HRESULT Clone( [out] IEnumPredictionCandidatePrimitive
        **ppenum );
};
```

In one embodiment, an enumerator prediction candidate interface can be configured as follows:

```
interface IEnumIMtfPredictionCandidate : IUnknown {
    HRESULT Next( [in] ULONG ulCount, [out]
IPredictionCandidate **ppCandidate, [out] ULONG *pcFetched );
    HRESULT Skip( [in] ULONG ulCount );
    HRESULT Reset( void );
    HRESULT Clone( [out] IEnumPredictionCandidate **ppenum );
};
```

As described above, the manager 108 can use information provided in the input query to determine which of the data sources DS1-DS(n) can be used to process the current input query. For example, based on the input type, the manager 108 can determine which of the data sources DS1-DS(n) are most applicable to provide candidates. Once the manager 108 determines the applicable data sources DS1-DS(n), the manager 108 sends the input query to each applicable data source. Each of the applicable data sources can then operate to process the input query and return any appropriate candidates to the manager 108. Thereafter, the manager 108 can collect and provide the candidates to the ranker 106 for further ranking, ordering, and/or other operations.

The ranker 106 can rank the candidate results according to a ranking algorithm, but is not so limited. In an embodiment, the ranking algorithm can be configured to output a rank of a candidate using one or more candidate probabilities provided by one or more of the candidate providers and confidence parameters, such as data source weights for example, associated with the data sources DS1-DS(n). For example, the ranking algorithm can be used to output a probability of a word by interpolating probabilities from one or more of the candidate providers. In one embodiment, the ranker 106 can be configured as a default ranker that ranks candidates using the following ranking algorithm:

$$P(w)=s1\times f_1(w)+s2\times f_2(w)+s3\times f_3(w)+\ldots+s(n)\times f_n(w) \quad (1)$$

wherein,

P(w) is the output which corresponds to the probability of a given candidate;

s1 . . . s(n) correspond to weights of the data sources DS(1)-DS(n) used in the ranking determination; and, $f_1(w) \ldots f_n(w)$ correspond to probabilities of candidates provided by the candidate providers CP1-CP(n).

In an embodiment, a weight associated with a data source can be stored locally by using a one or more APIs. Applications and input methods can change the weighting of data sources by using the APIs. The manager 108 can also be configured to control the weighting of data sources. Once the manager 108 receives an input query, a data source weight can be read and the weighting information can be used by the ranker 106 to prioritize all candidate results for that particular input query. A data source weight only has to be read once when an input query is received. If the same string is matched by multiple data sources, the ranker 106 can operate to sum the probabilities associated with the string from each data source, and return only one instance of the string with the summed probabilities. After ranking using (1), the ranker 106 can operate to sort or order the ranked candidates according to the output of the ranking algorithm, and return the ordered results to the manager 108. Thereafter, the manager 108 can communicate the ordered results to the Input Method 104, application, method, or some other interface.

As described briefly above, the ranker 106 can be customized and/or replaced with a different ranker and ranking algorithm according to a desired ranking functionality. For example, a user may want to use a customized ranking algorithm to rank candidates rather than using the ranking algorithm (1) based in part on a type of input method and statistical model. As one example, a custom ranker, such as QWERTY keyboard ranker, can be used to replace the ranking algorithm (1) used in a ranking determination. The QWERTY keyboard ranker can be configured to rank words higher if the associated language model probability is high and require at least 2 more key presses. As another example, a custom ranker, such as a 12-key phone keypad input ranker, can be used to replace the ranking algorithm (1) used in a ranking determination. The 12-key phone keypad input ranker can be configured to rank by giving preference to words that have the same number of characters as key presses. This is because input like 227 on a 12-key phone could be "car" "bar", or "cap"; but, if you try to predict ahead it could also be "Carlton", "capital", "Barcelona", etc. As described above, custom data sources and/or candidate providers can also be included and used by the ranker 106 to rank and order candidates. Correspondingly, users, such as researches and developers for example, can create and test complicated statistical and learning algorithms on the data to optimize prediction results.

An illustrative example follows. For this example, assume that the manager 108 has identified three data sources (DS1, DS2, and DS3) to use for providing candidates based on the type of input. The manager 108 has also assigned weights to each of the three data sources. The manager 108 has assigned a weight of: 0.70 to DS1; 0.20 to DS2; and, 0.10 to DS3. As described above, weights can be assigned to various data sources based in part on an input query and/or a confidence level or relevancy associated with each data source.

For this example, assume that a user has typed the input "Microsoft P" using the Input Method 104. As described above, the user could also have handwritten or inked the input, or spoken the input into a speech recognition engine for example. Accordingly, the input query corresponding with the user input includes "Microsoft" as a previous word primitive, and "P" as an undetermined input stream. The user or application has further specified that it only wants the top 4 results and the input language is English. The input query is then communicated to the manager 108.

The manager 108 can operate to identify any data sources that are currently registered to receive input queries that can handle the input query. After identifying the appropriate data source or sources, the manager 108 can forward the query to each currently registered data source. In this example, the manager 108 has identified DS1, DS2, and DS3 as being currently registered data sources that can handle the current input query. DST receives the input query from the manager 108 and finds that the "P" prefix matches 1000 words, but the "P following "Microsoft" only matches 3 candidates. Based on its findings DS1, returns the following 3 candidates: "PowerPoint" having an associated probability of 0.50, "Project" having an associated probability of 0.30, and "Project Studio" having an associated probability of 0.20. DS2 also receives the input query from the manager 108 and finds that the "P" prefix matches 200 words, but the "P following "Microsoft" only matches 1 candidate: "Photoeditor" having an associated probability of 1. DS3 also receives the input query from the manager 108 and finds that the "P" prefix matches 10 words, but the "P following "Microsoft" only matches 1 candidate: "Print" having an associated probability of 1.

The manager 108 can then return the candidates to the ranker 106 can use the ranking algorithm (1) or a custom ranking algorithm to rank the returned candidates as shown in Table 2 below.

TABLE 2

| Data Source | Word | Word Probability |
|---|---|---|
| DS 1 | PowerPoint | .7 * .5 = 0.35 |
| DS 1 | Project | .7 * .3 = 0.21 |
| DS 1 | Project Studio | .7 * .2 = 0.14 |
| DS 2 | PhotoEditor | .2 * 1 = 0.2 |
| DS 3 | Print | .1 * 1 = 0.1 |

The ranker 106 then orders the results, and returns the top 4 results which can be displayed in the Input Method 104. The top 4 results are shown in Table 3 below.

TABLE 3

| Candidate Result | Rank | Word Probability |
|---|---|---|
| PowerPoint | 1 | 0.35 |
| Project | 2 | 0.21 |
| PhotoEditor | 3 | 0.2 |
| Project Studio | 4 | 0.14 |

As described above, the system 100 can be used to provide textual input prediction, handwriting input prediction, and/or voice-based input prediction, but the system 100 is not so limited. For example, speech and handwriting recognition programs can use aspects of the system 100 to match ink data or voice sounds to words stored in a lexicon language model. A handwriting or speech recognition engine can calculate how closely the ink data or speech sound matches words since these programs can query all of the registered data sources of the system 100 to get access to lexicons that may not be not in their current language models. Accordingly, the handwriting and speech engines can call on all registered data sources to identify words that are not in their engines in order to make their engines more accurate.

As another example, aspects of the system 100 can be used to provide auto-complete solutions for handwriting. A handwriting engine can try to recognize each character as a user writes. After each character is recognized, the prediction engine 102 and registered data sources can be queried to get a list of prediction results to display in a prediction UI. If a user sees the word they were trying to handwrite they can then just tap on it saving pen strokes.

As further example, aspects of the system 100 can be used to correct speech and handwriting recognition errors. Handwriting and speech recognition programs can use the prediction engine 102 to generate queries containing different recognition results to determine a probability ranking for display in an associated UI or to determine if there are other high probability matches based on a prefix or regular expression.

As yet another example, components of the system 100 can be used in conjunction with speech and/or handwriting recognition systems. These recognition systems can be configured to recognize n number of potential strings that match the handwriting (e.g., ink) or speech data. The strings can then be submitted to the prediction engine 102 as prefix or exact match queries against any installed data sources and/or candidate providers. The results returned by the installed data sources and/or candidate providers can be used by the prediction engine 102 to provide a ranked list of the most probable candidates. Handwriting and speech recognition systems can be configured to assign a probability and/or weight to each recognized word based on how close the input matches the associated system model. The probability of the speech/handwriting recognition systems can be combined with a candidate probability provided by the prediction engine 102 to determine a final probability ranking of each candidate to recognize the candidate having a combined highest probability.

The components of system 100 described above can be implemented as part of networked, distributed, or other computer-implemented environment. The system 100 can be employed in a variety of computing environments and applications. For example, the system 100 can used with computing devices having networking, security, and other communication components configured to provide communication functionality with other computing and/or communication devices. Such computing devices include desktop computers, laptop computers, tablet computers, handheld devices (e.g. smart phone, ultra-mobile personal computer, etc.), and/or other communication devices.

The embodiments described herein can be used with a number of applications, systems, and other devices and are not limited to any particular implementation or architecture. Moreover, certain components and functionalities can be implemented either in hardware or software. While certain embodiments include software implementations, they are not so limited and they encompass hardware, or mixed hardware/software solutions. Also, while certain data structures, component features, and predictive functionality has been described herein, the embodiments are not so limited and can include more complex data structures, features, and other functionality. Accordingly, the embodiments and examples described herein are not intended to be limiting and other embodiments are available.

Figure 2:
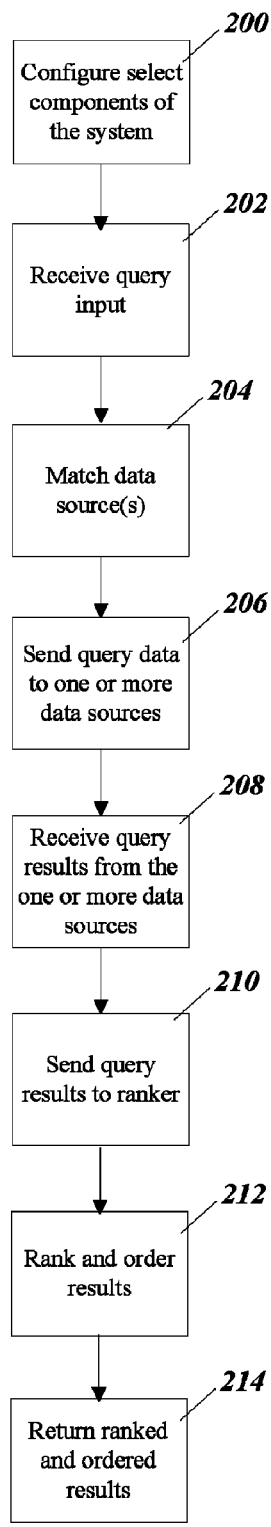
FIG. 2 is a flow diagram illustrating an example of providing information based in an input.

FIG. 2 is a flow diagram illustrating a prediction and ranking of one or more candidates, under an embodiment. The components of FIG. 1 are used in describing the flow diagram, but the embodiment is not so limited. At 200, the user can configure aspects of one or more components of the system 100 according to achieve a desired functionality. For example, the user can interact with the prediction engine 102 to customize the ranker 106 and/or ranking algorithm, or the user can choose to use a default ranking algorithm, such as ranking algorithm (1) above. As further example, a user can control the type and number of data sources, language, and number of candidates to return as part of a prediction operation.

At 202, the manager 108 receives an input query associated with a user operation or communication. For example, a user may be emailing a friend by using a stylus to enter characters using a digitized keyboard, wherein the user input can be provided to the prediction engine 102 to predict a word, phrase, acronym, or other character string. As further example, a user may be dictating a message and dictated words can be provided to the prediction engine 102 to predict a word, phrase, acronym, or other character string. At 204, the manager 108 can match one or more of the data sources DS1-DS(n) based in part on the input query and any configuration settings at 200. For example, the manager 108 may only match certain data sources based on the language requirements made by the user.

At 206, the manager 108 sends query data associated with the input query to the one or more matched data sources DS1-DS(n). After predicting candidates, at 208 the manager 108 can receive or collect query results from the one or more data sources DS1-DS(n). For example, the manager 108 can collect predicted candidates from a plurality of data sources, wherein each data source can return results, such as one or more predicted candidates, associated probabilities, and other information that can be used in ranking and ordering the results. At 210, the manager 108 sends the results to the ranker 106 for ranking and ordering.

Based in part on the ranker and/or ranking algorithm, the query results can be ranked and ordered at 212. For example, as described above, ranker 106 and the ranking algorithm (1) can be used to output probabilities of given candidates based in part on data source weighting factors and probabilities of candidates provided by the one or more data sources DS1-DS(n). As another example, if a user has registered a custom ranker and/or ranking algorithm, a different resultant set of candidates can be ranked and ordered based in part of the particular ranker and/or ranking algorithm. At 214, the manager 108 can operate to return the ranked and ordered results to the Input Method 104 or other application. While a certain order and number of operations are described with respect to FIG. 2, the order and number of operations can be changed according to a desired implementation.

Exemplary Operating Environment

Figure 3:
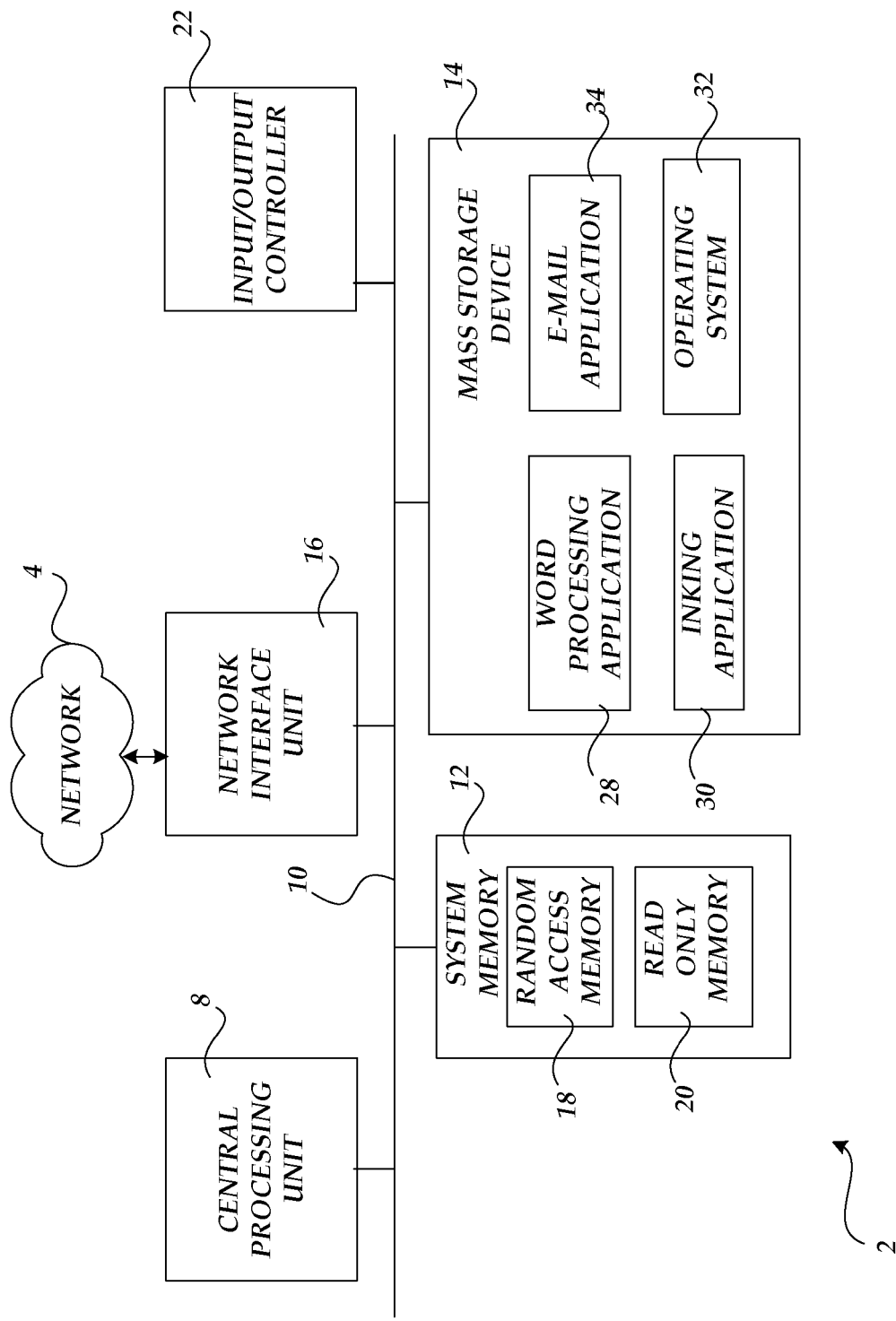
FIG. 3 is a block diagram illustrating a computing environment for implementation of various embodiments described herein.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM"), a read-only memory ("ROM") 20, a textual store 25, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs, and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, speech-based, and/or other means. Other input means are available including combinations of various input means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. for example. The mass storage device 14 and RAM 18 may also store one or more program modules. In particular, the mass storage device 14 and the RAM 18 may store other application programs, such as a word processing application 28, an inking application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computing system for providing information based on an input, the system comprising:
   a plurality of data sources including:
      a plurality of data stores, wherein each data store includes stored lexical data and other information; and,
      a plurality of candidate providers to provide one or more candidates and prediction information associated with the one or more provided candidates based in part on the input and the stored data of the one or more data stores;
   a managing component to direct the input to at least one of the plurality of data sources based in part on an input type including handwritten, speech-based, and typed input types; and,
   a ranking component to rank the one or more provided candidates, wherein the ranking component includes a ranking algorithm to output a ranked candidate based in part on the one or more provided candidates, the prediction information, and one or more confidence parameters associated with one or more of the plurality of data sources.

2. The system of claim 1, wherein the managing component is further configured to communicate the ranked candidate from the ranking component to a user interface (UI) used to provide the input.

3. The system of claim 1, wherein the managing component is further configured to communicate the ranked candidate to an application associated with the input.

4. The system of claim 1, wherein the managing component is further configured to direct the input to at least one of the plurality of data sources based in part on a handwritten input.

5. The system of claim 1, wherein the managing component is further configured to direct the input to at least one of the plurality of data sources based in part on a speech-based input.

6. The system of claim 1, wherein the managing component is further configured to direct the input to at least one of the plurality of data sources based in part on a typed input.

7. The system of claim 1, wherein the ranking component can be customized by replacing the ranking algorithm with a custom ranking function configured to output the ranked candidate.

8. The system of claim 1, wherein the managing component is configured to forward a notification based on the input to the ranking component and at least one of the data sources, wherein the notification can be used to adjust a prediction configuration, wherein the prediction configuration is selected from a group consisting of a language model, a tailored ranking algorithm, and candidate provider.

9. The system of claim 1, wherein the plurality of data sources is available to disparate input methods that use lexicons for input.

10. The system of claim 1, wherein the ranking component includes a ranking algorithm which comprises:

$$P(w) = s1 \times f_1(w) + s2 \times f_2(w) + s3 \times f_3(w) + \ldots s(n) \times f_n(w)$$

wherein,

P(w) is an output which corresponds to the probability of a given candidate;

s1 ... s(n) correspond to weights of the data sources; and, f1(w) ... $f_n$(w) correspond to probabilities of candidates provided by the candidate providers.

11. The system of claim 10, wherein the ranking component is further configured to sort outputs of the ranking algorithm in a numerical order.

12. The system of claim 10, wherein the ranking component is further configured to provide a number of sorted candidate probabilities according to a specified number of ranked candidates.

13. A computer-readable storage medium coupled to a computing device and including executable instructions which, when executed, predict information by:

receiving a query input, wherein the query input includes an input type;

predicting candidates based in part on the query input including directing the query input to one or more of a plurality of data sources based in part on the input type including handwritten, speech-based, and typed input types, wherein the plurality of data sources provide the predicted candidates;

ranking the predicted candidates based in part on a candidate probability and a data source weight to provide ranked candidates; and, ordering the ranked candidates in a numerical order.

14. The computer-readable storage medium of claim 13, further predicting information by ranking the predicted candidates with a custom ranking component.

15. The computer-readable storage medium of claim 13, further predicting information by predicting candidates using a number of custom data sources.

16. The computer-readable storage medium of claim 13, further predicting information by using a handwritten input, spoken input, or typed input.

17. A computer-implemented method of providing information comprising:

receiving an input associated with a user query;

predicting words based in part on the input using a plurality of data sources including directing the input to one or more of the plurality of data sources based in part on an input type including handwritten, spoken, and typed input types, wherein the plurality of data sources includes a plurality of providers having disparate prediction functionalities;

ranking the predicted words using a ranking algorithm to output a rank of a predicted word based on a predicted word probability and a confidence parameter to provide ranked words;

sorting the ranked words; and, displaying one or more of the ranked words using a display.

18. The computer-implemented method of claim 17, further comprising ranking the predicted words using a ranking algorithm that outputs a rank of a predicted word based on a predicted word probability and a weight associated with one of the plurality of data sources.

19. The computer-implemented method of claim 17, further comprising replacing the ranking algorithm with a custom ranking algorithm to rank the candidates.

* * * * *